UNITED STATES PATENT OFFICE.

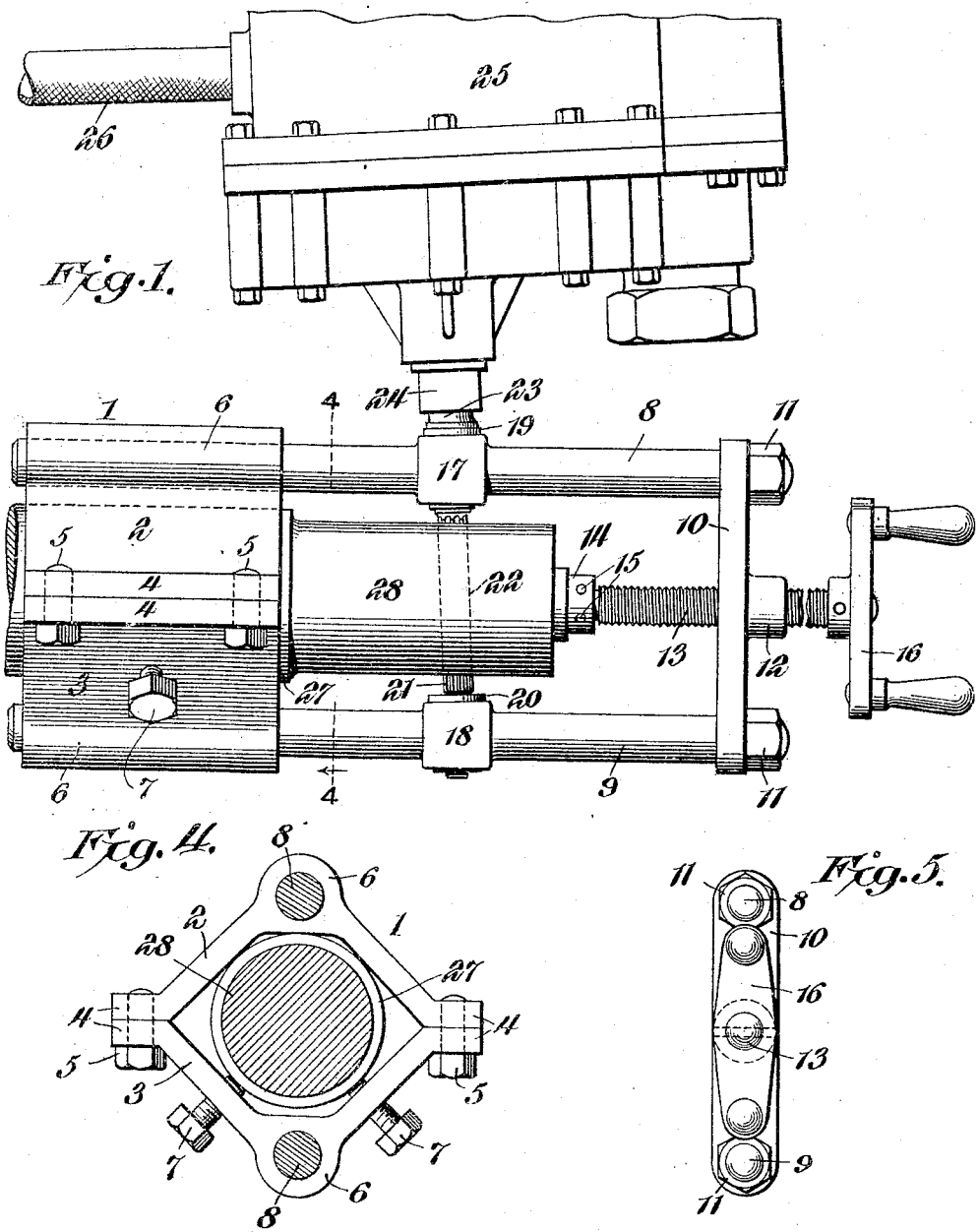

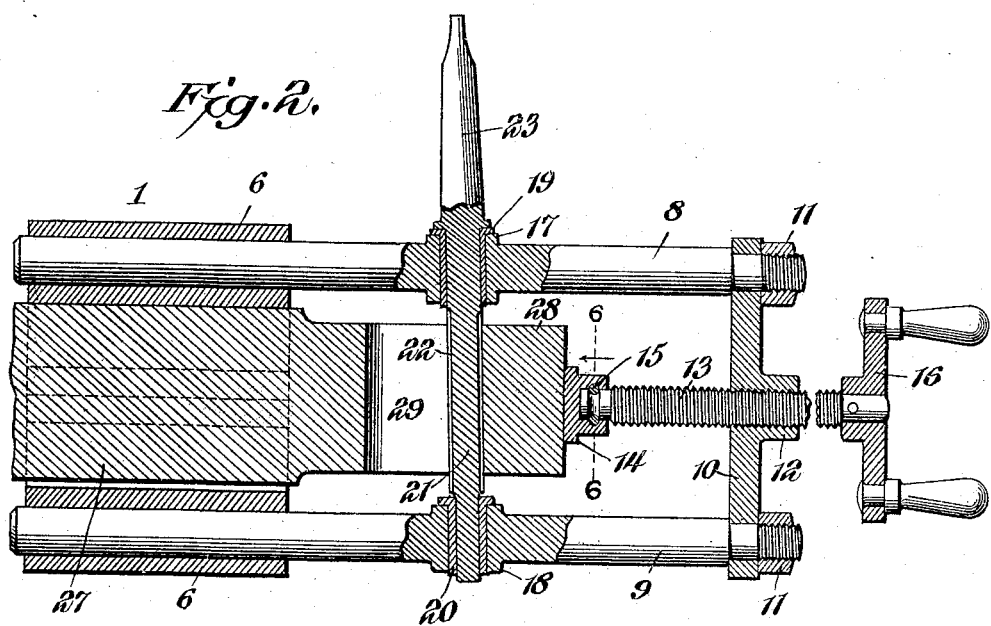
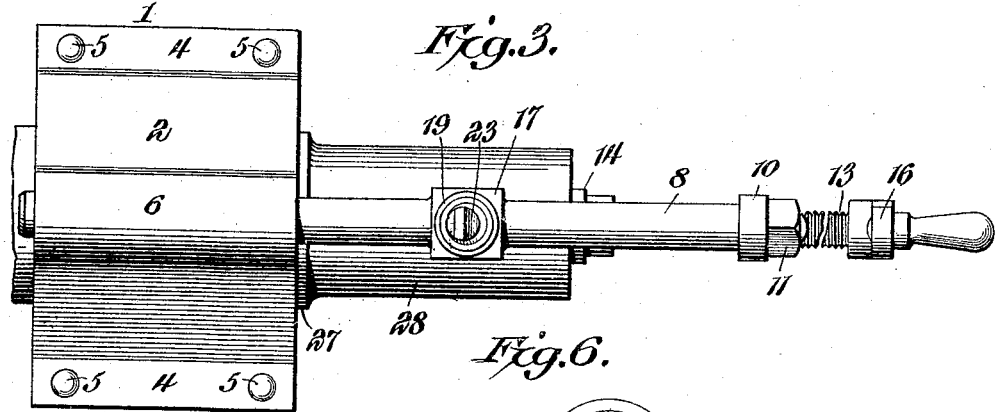
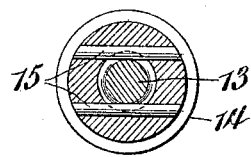

EMMETT G. DETRICK, OF VICKSBURG, MISSISSIPPI, ASSIGNOR OF ONE-HALF TO STEPHEN P. BOLIAN, OF VICKSBURG, MISSISSIPPI.

KEYWAY-CUTTING DEVICE.

1,200,711.  Specification of Letters Patent.  Patented Oct. 10, 1916.

Application filed September 7, 1915. Serial No. 49,291.

*To all whom it may concern:*

Be it known that I, EMMETT G. DETRICK, a citizen of the United States, residing at Vicksburg, in the county of Warren and State of Mississippi, have invented a new and useful Keyway-Cutting Device, of which the following is a specification.

This invention has reference to keyway-cutting devices, and its object is to provide means whereby a keyway may be cut in a shaft or rod accurately and expeditiously.

In accordance with the present invention there is provided a body member designed to be clamped firmly on the rod in which the keyway is to be cut and mounted on the body member so as to move therein is a milling tool carrier with actuating means designed to engage the rod in which the keyway is to be cut to cause the feed of the milling tool. In order to drive the milling tool any suitable motor is employed, such, for instance, as an air motor, although, of course, an electric or other power motor may be used instead of an air motor.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—Figure 1 is an elevation of the keyway-cutting device as applied to a rod and showing a portion of an air motor in driving relation to a milling tool. Fig. 2 is a longitudinal section with some parts in elevation of the structure shown in Fig. 1, the section beng taken in a plane lengthwise of the milling tool. Fig. 3 is a plan view of the structure of Fig. 1 with the motor omitted. Fig. 4 is a section on the line 4—4 of Fig. 1. Fig. 5 is an end elevation of the tool carriage as viewed from the right hand end of Fig. 1. Fig. 6 is a section on the line 6—6 of Fig. 2 omitting distant parts.

Refering to the drawings there is shown a body member 1 consisting of two generally similar angle structures 2, 3, with matching edge flanges 4 adapted to be brought into engagement and there held by screws 5. The angle of each member 2 and 3 is thickened as shown at 6 and is bored lengthwise so that when the two members 2 and 3 are secured together the bores through the angles 6 are in parallel relation. The sides of the member 3 on opposite sides of the angle 6 have set screws 7 threaded therethrough, each side carrying one screw, although, of course, more than one screw may be employed if found desirable.

Fitted to the bores of the angle portions 6 of the members 2 and 3 are rods 8 and 9, respectively, the rod 8 being carried by the portion 2 of the body member 1 and the rod 9 being carried by the portion 3 of the member 1. One end portion of each rod 8 and 9 is adapted to slide lengthwise through the body member, while the other ends of the rods 8 and 9 are firmly connected together by a cross head 10 which is held to the rods by nuts 11 threaded on the extremities of the rods. At a mid point in the length of the cross head 10 the latter is provided with a boss 12 through which is threaded a screw-threaded rod 13 carrying a presser block 14 at one end swiveled to the rod as shown at 15, while at the other end of the rod there is a handle member 16 made fast to the screw-threaded rod. This handle member may be of the double crank form projecting on opposite sides of the axis of rotation, or it may be of any other desired construction.

Intermediate of the length of the rods 8 and 9 they are formed with enlargements 17, 18, respectively, provided with respective bushings 19, 20. These bushings form journal bearings for a milling tool or cutter 21 with the milling portion 22 extending between the rods 8 and 9, while one end of the cutter has a Morse-taper shank 23 adapting it to receive the drive member 24 of a motor 25. Such motor may be of any suitable type and is shown in the drawings as an air motor designed to receive air under pressure through a pipe 26, but any other suitable form of motor adapted to the purposes of the present invention may be employed.

The rod in which the keyway is to be cut is indicated at 27, and in the particular showing of the drawings the keyway is to be cut in a reduced end 28 of the rod 27. For convenience of description it may be considered that the rod 27 is a piston rod, but, of course, it may represent any rod or shaft in which a keyway is to be cut.

In the operation of the device a hole is first bored diametrically through the rod or shaft 27 at a point sufficiently distant from the outer end of the rod 27 to represent that end of the keyway remote from the outer extremity of the reduced end of the rod. The motor and milling tool having been removed the body member 1 is placed upon the rod with the screws 7 retracted. The rods 8 and 9 are moved into the body member sufficiently so that the bearings of the milling tool 21 are opposite the ends of the hole already through the rod 27. Now, the milling tool is seated in the bushings 19 and 20 thus centering the structure on the rod 27 and finally the screws 7 are screwed up tight, whereby the device is clamped to the rod 27 in centered relation thereto, the motor 25 having been first applied to the milling tool and started off gently, whereby the whole structure becomes in perfect alinement ready for the cutting of the keyway to proceed. Now, by turning the screw rod 13 in a direction to bring the head 14 against the outer extremity of the reduced end 28 of the piston rod or shaft 27 the milling tool 21 is caused to bear against that wall of the hole already bored through the rod or shaft toward the free end of the shaft. The milling tool is rotated at a suitable high speed by the motor and the tool is caused to bear with suitable force against the metal of the rod or shaft within the transverse hole thus causing the tool to cut its way lengthwise of the shaft and all the way through the shaft, thereby producing an elongated slot indicated at 29 in Fig. 2.

The device of the present invention produces true keyways with great rapidity. For instance, in a practical test a keyway five-eighths of an inch wide by three and one-half inches deep and three and one-half inches long was cut through a piece of open-hearth steel in six minutes actual cutting time.

Ordinarily keyways are produced by boring a series of closely spaced holes, chipping out the intervening webs and finely filing the slot into shape, all at a relatively great expenditure of time as compared with the work of the device hereinbefore described.

What is claimed is:—

1. A device for cutting keyways in rods or shafts, comprising a clamp having means for attaching it to the rod or shaft, a carriage for a milling tool said carriage, supporting by, movable through and extending beyond one end of the clamp and having means for supporting the tool when extended entirely through the shaft from side to side thereof, and means on the carriage in position to engage one end of the rod or shaft in a direction to cause the feed of the carriage and the milling tool lengthwise of the shaft.

2. A device for cutting keyways in rods or shafts comprising a body member having means for centering and clamping the rod or shaft therein, an elongated carriage comprising rods joined together at one end and each at the other end mounted in the body member to slide therein, said rods being spaced apart sufficiently to permit the shaft to extend lengthwise between them and each rod having a journal bearing for correspondingly spaced portions of a milling tool adapted to traverse the rod or shaft in which the keyway is to be cut, and feeding means on the carriage adapted to engage the shaft axially to move the milling tool while traversing the shaft in a direction lengthwise of the shaft.

3. A keyway cutter for rods or shafts, comprising a carriage for supporting a milling tool of a length to extend entirely through the shaft from side to side of the latter, means for attaching the carriage to the rod or shaft and along which means the carriage is movable, said carriage extending beyond one end of said attaching means, and feeding means for the carriage at the end of the latter remote from the attaching means and adapted to engage the corresponding end of the rod or shaft for feeding the carriage and tool lengthwise of the shaft by such engagement.

4. A device for cutting keyways in rods or shafts comprising a body member with means for securing it to the rod or shaft in which the keyway is to be cut, a carriage mounted on and projecting beyond one end of the body member and slidable with relation thereto in a direction lengthwise of the rod or shaft when the body member is secured to said shaft, said carriage having members on opposite sides of the rod or shaft and provided with bearings for a cutting tool in traversing relation to the rod or shaft, and feeding means at the end of the carriage remote from the body member in position to engage the corresponding end of the rod or shaft in which the keyway is to be cut.

5. A device for cutting keyways in rods or shafts, comprising a body member having a polygonal passage therethrough with set screws on one side of the longitudinal center line of the body member to clamp the rod or shaft against the opposite side of the passage through the body member, and said body member having bores therethrough on opposite sides of the said passage, a tool carriage comprising rods adapted to the bores with a yoke connecting like ends of the rods together, and said rods between their ends being provided with journal bearings for a milling tool spaced apart a distance sufficient to accommodate a milling tool of a length to extend diametrically through the rod or shaft in which the keyway is to be cut, and a feed screw mounted on the yoke in position to bear against the free end of the rod or shaft in which the keyway is to be cut to cause the travel of the milling tool lengthwise of the rod or shaft while in traversing relation to said rod or shaft.

6. A device for cutting keyways in rods or shafts comprising a carriage having journal supports for a cutting tool separated for location on opposite sides of the rod or shaft in which the keyway is to be cut, a centering guide for the carriage adapted to be clamped to the rod or shaft, and feeding means for the carriage mounted on the latter in position to engage one end of the rod or shaft to move the cutter lengthwise of the rod or shaft toward said end thereof.

7. A device for cutting keyways lengthwise of rods or shafts and extending entirely through the rod or shaft, comprising a carrier having journal bearings for opposite end portions of a cutting tool of a length to extend entirely through the shaft transversely thereof, the journal supports for the tool being located on opposite sides of the rod or shaft when the device is applied thereto, and feeding means on the carrier in position to engage one end of the rod or shaft to feed the tool toward that end of the rod or shaft engaged by the feeding means.

8. A device for cutting keyways in rods or shafts comprising a body member with means for securing it to the rod or shaft, a carriage mounted in and projecting from one end of and movable with relation to the body member, a milling cutter journaled in the carriage in position to traverse the rod or shaft in which the keyway is to be cut, a feed screw on the carriage at the end of the latter remote from the body member and in position to engage one end of the rod or shaft to move the cutter lengthwise of the rod or shaft toward said end with the cutter traversing the shaft, and driving means for the cutter adapted to be applied to said cutter for actuating the latter.

9. In a machine for cutting keyways lengthwise of and at the same time entirely through rods or shafts transversely thereof, a carriage, means for mounting the carriage upon the shaft in which the keyway is to be cut, means on the carriage for engaging the shaft to feed the carriage lengthwise of the shaft, and holding means on the carriage for a milling tool of a length sufficient to traverse the shaft with the axis of rotation of the tool extending through the shaft transversely of the latter.

10. A machine for cutting keyways entirely through and at the same time lengthwise of shafts or rods, comprising a support adapted to be secured to the shaft and having means thereon adapted to be located on opposite sides of the shaft to receive and hold a milling tool of a length to entirely traverse the shaft, and feeding means for the tool holding means having means for engaging the shaft to cause the feeding of the tool lengthwise of the latter, whereby the machine produces a keyway in the form of a slot extending entirely through the shaft.

In testimony, that I claim the foregoing as my own, I have hereto affixed my signature in the presence of two witnesses.

EMMETT G. DETRICK.

Witnesses:
 HERBERT ASPDEN,
 ARTHUR MARTIN.

Copies of this patent may be obtained for five cents each, by addressing the "Commissioner of Patents, Washington, D. C."